US011697541B2

(12) United States Patent
Ginosatis

(10) Patent No.: US 11,697,541 B2
(45) Date of Patent: Jul. 11, 2023

(54) OVEN SKIN PACKAGING PROCESS

(71) Applicant: FLEXOPACK S.A., Koropi (GR)

(72) Inventor: Dimitris Ginosatis, Koropi Attica (GR)

(73) Assignee: FLEXOPACK S.A., Koropi (GR)

(*) Notice: Subject to any disclaimer, the term of this patent is extended or adjusted under 35 U.S.C. 154(b) by 439 days.

(21) Appl. No.: 14/946,169

(22) Filed: Nov. 19, 2015

(65) Prior Publication Data

US 2016/0176612 A1 Jun. 23, 2016

(30) Foreign Application Priority Data

Nov. 19, 2014 (EP) .................................. 14193920

(51) Int. Cl.
*B65D 81/34* (2006.01)
*B65D 81/20* (2006.01)
*B65D 75/32* (2006.01)
*A23L 5/10* (2016.01)
*B65D 75/30* (2006.01)

(52) U.S. Cl.
CPC .............. *B65D 81/343* (2013.01); *A23L 5/15* (2016.08); *B65D 75/305* (2013.01); *B65D 75/32* (2013.01); *B65D 81/2015* (2013.01); *A23V 2002/00* (2013.01)

(58) Field of Classification Search
CPC .............. B65D 81/343; B65D 81/3438; B65D 81/3446; B65D 81/3453; B65D 81/3461; B32B 2250/04; B32B 2250/05
See application file for complete search history.

(56) References Cited

U.S. PATENT DOCUMENTS

| | | | |
|---|---|---|---|
| 2,380,054 A | 8/1943 | Lautmann | |
| 2,376,185 A | 5/1945 | Randall | |
| 3,214,884 A | 11/1965 | Langdon | |
| 3,299,194 A | 1/1967 | Golike | |
| 3,456,044 A | 7/1969 | Pahlke | |
| 3,536,192 A | 10/1970 | Couper | |
| 3,846,569 A | 11/1974 | Kaplan | |
| 3,908,336 A | 9/1975 | Forslund | |
| 3,956,229 A | 5/1976 | Bollen et al. | |
| 4,064,296 A | 12/1977 | Bornstein et al. | |
| 4,207,363 A | 6/1980 | Lustig | |
| 4,207,364 A | 6/1980 | Nyberg | |
| 4,220,684 A | 9/1980 | Olson | |
| 4,254,869 A | 3/1981 | Heier | |
| 4,362,834 A | 12/1982 | Lefevre et al. | |
| 4,399,181 A | 8/1983 | Yoshimura et al. | |
| 4,595,433 A | 6/1986 | Ford et al. | |
| 4,612,221 A | 9/1986 | Biel et al. | |
| 4,619,849 A | 10/1986 | Anzawa et al. | |
| 4,650,721 A | 3/1987 | Ashcraft et al. | |
| 4,701,360 A | 10/1987 | Gibbons et al. | |
| 4,705,707 A | 11/1987 | Winter | |
| 4,716,061 A | 12/1987 | Winter | |
| 4,724,185 A * | 2/1988 | Shah | B32B 27/34 156/244.11 |
| 4,786,561 A | 11/1988 | Fong | |
| 4,801,486 A | 1/1989 | Quacquarella et al. | |
| 4,828,915 A | 5/1989 | Schroeder et al. | |
| 4,857,399 A | 8/1989 | Vicik | |
| 4,863,769 A | 9/1989 | Lustig et al. | |
| 4,869,049 A | 9/1989 | Richards et al. | |
| 4,911,979 A | 3/1990 | Nishimoto et al. | |
| 4,912,149 A | 3/1990 | Robeson et al. | |
| 4,934,529 A | 6/1990 | Richards et al. | |
| 4,941,310 A | 7/1990 | Kristen | |
| 4,976,898 A | 12/1990 | Lustig et al. | |
| 4,977,022 A | 12/1990 | Mueller | |
| 4,990,562 A | 2/1991 | Chou et al. | |
| 5,001,192 A | 3/1991 | Sun | |
| 5,002,996 A | 3/1991 | Okuda et al. | |
| 5,034,281 A | 7/1991 | Kawasaki et al. | |
| 5,079,051 A | 1/1992 | Garland et al. | |
| 5,092,105 A | 3/1992 | Bish | |
| 5,142,123 A | 8/1992 | Chou | |
| 5,145,728 A | 9/1992 | Itaba et al. | |
| 5,169,708 A | 12/1992 | Amaral et al. | |
| 5,179,168 A | 1/1993 | Hirasawa | |
| 5,256,351 A | 10/1993 | Lustig et al. | |
| 5,256,428 A | 10/1993 | Lustig et al. | |
| 5,296,580 A | 3/1994 | Matsunaga et al. | |
| 5,298,202 A | 3/1994 | Schirmer | |
| 5,302,402 A | 4/1994 | Dudenhoeffer et al. | |

(Continued)

FOREIGN PATENT DOCUMENTS

| | | |
|---|---|---|
| AU | 511 195 B2 | 7/1980 |
| CN | 104695251 A | 6/2015 |

(Continued)

OTHER PUBLICATIONS

Office Action corresponding to U.S. Appl. No. 13/682,160 dated Dec. 12, 2017.
Office Action corresponding to U.S. Appl. No. 14/612,175 dated Mar. 30, 2018.
Office Action corresponding to U.S. Appl. No. 15/042,615 dated Mar. 30, 2018.
Advisory Action, Examiner Initiated Interview Summary, and AFCP 2.0 Decision corresponding to U.S. Appl. No. 14/612,175 dated Jan. 4, 2017.
Kerns, "What's the Difference Between Batteries and Capacitors?" Machine Design, Batteries/Power Supplies, pp. 1-4 (May 11, 2015).

(Continued)

*Primary Examiner* — Erik Kashnikow
*Assistant Examiner* — Lela S. Davis
(74) *Attorney, Agent, or Firm* — Jenkins, Wilson, Taylor & Hunt, P.A.

(57) ABSTRACT

The invention relates to a vacuum skin food package for use in a conventional oven and more particularly to a food package able to withstand conditions up to 200° C. comprising a thermoplastic lid film which is free of polyester and contains crosslinked EVA.

7 Claims, No Drawings

(56) References Cited

U.S. PATENT DOCUMENTS

| | | | |
|---|---|---|---|
| 5,350,788 A | 9/1994 | Visioli et al. | |
| 5,358,792 A | 10/1994 | Mehta et al. | |
| 5,382,470 A | 1/1995 | Vicik | |
| 5,397,613 A | 3/1995 | Georgelos | |
| 5,562,958 A | 10/1996 | Walton et al. | |
| 5,593,747 A | 1/1997 | Georgelos | |
| 5,645,788 A | 7/1997 | Bekele | |
| 5,698,279 A | 12/1997 | Vicik | |
| 5,759,648 A * | 6/1998 | Idlas | B32B 27/32 428/332 |
| 5,834,077 A | 11/1998 | Babrowicz | |
| 5,837,335 A | 11/1998 | Babrowicz | |
| 5,851,610 A | 12/1998 | Ristey et al. | |
| 5,888,615 A | 3/1999 | Mascarenhas et al. | |
| 5,983,607 A | 11/1999 | Mihalov et al. | |
| 6,013,378 A | 1/2000 | White et al. | |
| 6,058,998 A | 5/2000 | Kristen | |
| 6,065,272 A | 5/2000 | Lecomte | |
| 6,074,715 A | 6/2000 | Lind et al. | |
| 6,088,996 A | 7/2000 | Maruyama | |
| 6,120,860 A * | 9/2000 | Bowen | B32B 27/06 428/34.2 |
| 6,146,726 A | 11/2000 | Yoshii et al. | |
| 6,220,753 B1 | 4/2001 | Metzger | |
| 6,221,410 B1 | 4/2001 | Ramesh et al. | |
| 6,258,423 B1 | 7/2001 | Giori | |
| 6,274,246 B1 | 8/2001 | Eggers et al. | |
| 6,299,984 B1 | 10/2001 | Forloni | |
| 6,346,285 B1 | 2/2002 | Ramesh | |
| 6,346,576 B1 | 2/2002 | Takahashi | |
| 6,374,579 B1 | 4/2002 | Muller | |
| 6,383,589 B1 | 5/2002 | Horan et al. | |
| 6,406,763 B1 | 6/2002 | Wolf et al. | |
| 6,458,437 B1 | 10/2002 | Ito et al. | |
| 6,506,463 B1 | 1/2003 | Cahill et al. | |
| 6,514,583 B1 | 2/2003 | Ahlgren et al. | |
| 6,516,588 B2 | 2/2003 | Jensen et al. | |
| 6,531,198 B2 | 3/2003 | Lind et al. | |
| 6,534,137 B1 | 3/2003 | Vadhar | |
| 6,558,760 B1 | 5/2003 | Paleari et al. | |
| 6,572,959 B1 | 6/2003 | Buongiorno et al. | |
| 6,592,975 B1 | 7/2003 | Ueyama et al. | |
| 6,610,046 B1 | 8/2003 | Usami et al. | |
| 6,663,905 B1 | 12/2003 | Ennis et al. | |
| 6,682,792 B2 | 1/2004 | Schmal et al. | |
| 6,682,825 B1 | 1/2004 | Kennedy et al. | |
| 6,777,046 B1 | 8/2004 | Tatarka et al. | |
| 6,869,686 B1 | 3/2005 | Idlas | |
| 6,960,635 B2 | 11/2005 | Stevens et al. | |
| 6,984,695 B2 | 1/2006 | Brown et al. | |
| 7,473,473 B2 | 1/2009 | Verrocchi | |
| 7,504,158 B2 | 3/2009 | Berrier et al. | |
| 7,611,770 B2 | 11/2009 | Kennedy et al. | |
| 7,736,726 B2 | 6/2010 | McAllister et al. | |
| 8,129,006 B2 | 3/2012 | Ginossatis | |
| 8,697,211 B2 | 4/2014 | Gkinosatis | |
| 9,290,320 B2 | 3/2016 | Gkinosatis | |
| 9,365,687 B2 | 6/2016 | Gkinosatis | |
| 9,440,778 B2 | 9/2016 | Gkinosatis | |
| 9,440,788 B2 | 9/2016 | Gkinosatis | |
| 9,604,430 B2 | 3/2017 | Gkinosatis | |
| 9,789,669 B2 | 10/2017 | Gkinosatis | |
| 10,287,094 B2 | 5/2019 | Gkinosatis | |
| 2002/0038535 A1 | 4/2002 | Jensen et al. | |
| 2002/0066261 A1 | 6/2002 | Richards | |
| 2002/0119334 A1 | 8/2002 | Shepard et al. | |
| 2002/0151653 A1 | 10/2002 | Jeong et al. | |
| 2002/0172834 A1 | 11/2002 | Rivett et al. | |
| 2003/0008084 A1 | 1/2003 | Vicik et al. | |
| 2003/0012900 A1 | 1/2003 | Wolf et al. | |
| 2003/0073785 A1 | 4/2003 | Okada et al. | |
| 2003/0124452 A1 | 7/2003 | Nair et al. | |
| 2003/0131569 A1 | 7/2003 | Chomik et al. | |
| 2003/0153688 A1 | 8/2003 | Lindahl et al. | |
| 2003/0213804 A1 | 11/2003 | Chomik et al. | |
| 2003/0218022 A1 | 11/2003 | Chomik et al. | |
| 2003/0220453 A1 | 11/2003 | Ebara et al. | |
| 2004/0020175 A1 | 2/2004 | Stravitz | |
| 2004/0020913 A1 | 2/2004 | Hovorka | |
| 2004/0043238 A1 | 3/2004 | Wuest et al. | |
| 2004/0048086 A1 | 3/2004 | Kennedy et al. | |
| 2004/0065052 A1 | 4/2004 | Ramesh et al. | |
| 2004/0074904 A1 | 4/2004 | Share et al. | |
| 2004/0115453 A1 | 6/2004 | McAllister, Jr. et al. | |
| 2004/0157077 A1 | 8/2004 | Roussos | |
| 2004/0158016 A1 | 8/2004 | Lee et al. | |
| 2004/0159972 A1 | 8/2004 | Koschmieder et al. | |
| 2004/0194433 A1 | 10/2004 | Chomik et al. | |
| 2005/0044819 A1 | 3/2005 | Chomik et al. | |
| 2005/0064123 A1 | 3/2005 | Chomik et al. | |
| 2005/0079372 A1 | 4/2005 | Schmal et al. | |
| 2005/0098927 A1 | 5/2005 | Iseki et al. | |
| 2005/0129811 A1 | 6/2005 | Kraimer et al. | |
| 2005/0147778 A1 | 7/2005 | Tai et al. | |
| 2005/0148268 A1 | 7/2005 | Tai | |
| 2005/0191439 A1 | 9/2005 | Hirose et al. | |
| 2005/0235611 A1 | 10/2005 | Roussos | |
| 2005/0239961 A1 | 10/2005 | Saraf et al. | |
| 2005/0271877 A1 | 12/2005 | Ginossatis | |
| 2006/0010837 A1 | 1/2006 | Jurus | |
| 2006/0172143 A1 | 8/2006 | Breese et al. | |
| 2006/0177616 A1 | 8/2006 | Barber et al. | |
| 2006/0177641 A1 | 8/2006 | Breese et al. | |
| 2006/0188676 A1 | 8/2006 | Dambricourt | |
| 2006/0199030 A1 | 9/2006 | Liang et al. | |
| 2006/0199911 A1 | 9/2006 | Markovich et al. | |
| 2006/0199912 A1 | 9/2006 | Fuchs et al. | |
| 2006/0254219 A1 | 11/2006 | Alipour et al. | |
| 2006/0272767 A1 | 12/2006 | Kreitman et al. | |
| 2006/0283153 A1 | 12/2006 | Nakano | |
| 2006/0286323 A1 | 12/2006 | Siegel et al. | |
| 2007/0031546 A1 | 2/2007 | Nelson et al. | |
| 2007/0042089 A1 | 2/2007 | Grah | |
| 2007/0082150 A1 | 4/2007 | Ginossatis | |
| 2007/0089688 A1 | 4/2007 | Nitzsche et al. | |
| 2007/0092748 A1 | 4/2007 | Suzuki et al. | |
| 2007/0098933 A1 | 5/2007 | Opuszko et al. | |
| 2007/0178285 A1 | 8/2007 | Rasanen et al. | |
| 2007/0237916 A1 | 10/2007 | Rasmussen et al. | |
| 2007/0276110 A1 | 11/2007 | Michie et al. | |
| 2008/0003332 A1 | 1/2008 | Ginossatis | |
| 2008/0070047 A1 | 3/2008 | Rehkugler et al. | |
| 2008/0095960 A1 | 4/2008 | Schell et al. | |
| 2008/0115463 A1 | 5/2008 | Wilson | |
| 2008/0221273 A1 | 9/2008 | Michie, Jr. et al. | |
| 2008/0233375 A1 | 9/2008 | Wright et al. | |
| 2008/0255311 A1 | 10/2008 | Chang et al. | |
| 2008/0274314 A1 | 11/2008 | Gkinosatis | |
| 2008/0274328 A1 | 11/2008 | Gkinosatis | |
| 2008/0305220 A1 | 12/2008 | Gkinosatis | |
| 2009/0013656 A1 | 1/2009 | Nasiatka et al. | |
| 2009/0034886 A1 | 2/2009 | Conforti | |
| 2009/0123614 A1 * | 5/2009 | Bernig | B65D 81/3453 220/366.1 |
| 2009/0176117 A1 | 7/2009 | Gkinosatis | |
| 2009/0191392 A1 | 7/2009 | Gkinosatis | |
| 2009/0196962 A1 | 8/2009 | Gkinosatis | |
| 2009/0240227 A1 | 9/2009 | Toro et al. | |
| 2009/0263599 A1 | 10/2009 | Gkinosatis | |
| 2010/0028574 A1 | 2/2010 | Gkinosatis | |
| 2010/0032098 A1 | 2/2010 | Lalli et al. | |
| 2010/0034939 A1 | 2/2010 | Gkinosatis | |
| 2010/0221391 A1 | 9/2010 | Fenghua et al. | |
| 2011/0039064 A1 | 2/2011 | Wani et al. | |
| 2011/0159263 A1 | 6/2011 | Gkinosatis | |
| 2011/0285048 A1 | 11/2011 | Barger et al. | |
| 2012/0141744 A1 | 6/2012 | Ambroise et al. | |
| 2012/0213896 A1 | 8/2012 | Owensby et al. | |
| 2012/0279181 A1 | 11/2012 | Gkinosatis | |
| 2012/0289645 A1 | 11/2012 | Tice et al. | |
| 2013/0019568 A1 | 1/2013 | Gkinosatis | |
| 2013/0209797 A1 | 8/2013 | Gkinosatis | |
| 2013/0227916 A1 | 9/2013 | Gkinosatis | |
| 2013/0255498 A1 | 10/2013 | Shibata | |

(56) References Cited

U.S. PATENT DOCUMENTS

| | | |
|---|---|---|
| 2015/0010764 A1 | 1/2015 | Gkinosatis |
| 2015/0122129 A1 | 5/2015 | Shibata |
| 2015/0210454 A1 | 7/2015 | Gkinosatis |
| 2016/0236862 A1 | 8/2016 | Gkinosatis |
| 2017/0259542 A1 | 9/2017 | Gkinosatis |
| 2019/0193378 A1 | 6/2019 | Gkinosatis |
| 2019/0193379 A1 | 6/2019 | Gkinosatis |
| 2019/0241335 A1 | 8/2019 | Ginosatis |
| 2019/0283383 A1 | 9/2019 | Ginosatis |
| 2020/0180284 A1 | 6/2020 | Ginosatis |
| 2021/0245478 A1 | 8/2021 | Ginosatis |

FOREIGN PATENT DOCUMENTS

| | | | |
|---|---|---|---|
| EP | 0 005 660 | 11/1979 | |
| EP | 0144239 A2 | 6/1985 | |
| EP | 0229477 A2 * | 7/1987 | ............ C08F 255/02 |
| EP | 0243510 A1 * | 11/1987 | ........... B32B 27/306 |
| EP | 0 286 407 | 10/1988 | |
| EP | 0 402 043 | 12/1990 | |
| EP | 0 472 418 | 2/1992 | |
| EP | 0 627 465 | 12/1994 | |
| EP | 0 686 497 A2 | 12/1995 | |
| EP | 0 810 087 | 12/1997 | |
| EP | 0810077 A2 | 12/1997 | |
| EP | 1 072 632 A2 | 1/2001 | |
| EP | 1300238 A2 | 4/2003 | |
| EP | 0 930 349 B1 | 6/2003 | |
| EP | 1 060 077 | 6/2003 | |
| EP | 1 131 205 | 12/2004 | |
| EP | 1 514 680 A1 | 3/2005 | |
| EP | 1592078 A2 | 11/2005 | |
| EP | 1 415 930 | 4/2006 | |
| EP | 1 770 116 A1 | 4/2007 | |
| EP | 1 854 625 A1 | 11/2007 | |
| EP | 08162162.5 | 8/2008 | |
| EP | 1 985 440 A2 | 10/2008 | |
| EP | 1 985 443 A2 | 10/2008 | |
| EP | 1 995 058 A1 | 11/2008 | |
| EP | 2 077 239 A2 | 7/2009 | |
| EP | 2 077 297 A1 | 7/2009 | |
| EP | 2 085 216 A1 | 8/2009 | |
| EP | 2 111 979 A2 | 10/2009 | |
| EP | 2 147 783 A1 | 1/2010 | |
| EP | 2 194 006 A1 | 6/2010 | |
| EP | 2 332 723 A1 | 6/2011 | |
| EP | 2 520 518 A2 | 11/2012 | |
| EP | 2985148 A1 | 2/2016 | |
| EP | 3216599 A1 | 9/2017 | |
| GB | 792290 | 3/1958 | |
| GB | 1 140 765 | 1/1969 | |
| GB | 2 236 531 | 4/1991 | |
| GB | 2 203 326 | 10/1998 | |
| JP | 62107810 A | 5/1987 | |
| JP | 03 200534 | 9/1991 | |
| JP | H06322140 A | 11/1994 | |
| JP | 07196818 | 8/1995 | |
| JP | 07206004 | 8/1995 | |
| JP | 07206005 | 8/1995 | |
| JP | 07206006 | 8/1995 | |
| JP | 2002-234975 | 8/2002 | |
| JP | 2003-159761 | 6/2003 | |
| JP | 2005-047959 | 2/2005 | |
| JP | 2005-335111 | 12/2005 | |
| JP | 2006-247870 | 9/2006 | |
| NZ | 567768 | 11/2009 | |
| NZ | 567767 | 5/2010 | |
| WO | WO1996/001736 | 1/1996 | |
| WO | WO 97/12758 A1 | 4/1997 | |
| WO | WO1997/046384 | 12/1997 | |
| WO | WO1998/021274 | 5/1998 | |
| WO | WO1998/021276 | 5/1998 | |
| WO | WO1999/044824 | 9/1999 | |
| WO | WO1999/057612 | 11/1999 | |
| WO | WO2000/061439 | 10/2000 | |
| WO | WO0063085 A1 | 12/2000 | |
| WO | WO2001/023268 | 4/2001 | |
| WO | WO2002/026493 | 4/2002 | |
| WO | WO2003/020515 | 3/2003 | |
| WO | WO-03061959 A1 * | 7/2003 | ............... B32B 3/02 |
| WO | WO2006/053885 | 5/2006 | |
| WO | WO2006/075141 | 7/2006 | |
| WO | WO 2006/076393 A2 | 7/2006 | |
| WO | WO2006/102152 | 9/2006 | |
| WO | WO2007/053603 | 5/2007 | |
| WO | WO2008/091321 | 7/2008 | |
| WO | WO2008/118554 | 10/2008 | |
| WO | WO 2009/052291 A2 | 4/2009 | |
| WO | WO 2011/029597 | 3/2011 | |

OTHER PUBLICATIONS

Notice of Decision form Post-Prosectuion Pilot Program (P3) Conference corresponding to U.S. Appl. No. 12/957,947 dated Dec. 14, 2016.
Official Action corresponding to U.S. Appl. No. 14/304,101 dated Dec. 9, 2016.
Official Action corresponding to U.S. Appl. No. 13/682,160 dated Mar. 2, 2017.
Pish, "Ragone Plot," 2016 Advisory Panel Energy Storage, Center for Electromechanics, The University of Texas at Austin https://utw10356.utweb.utexas.edu/sites/default/files/Pish.pdf, p. 1, (May 10, 2016).
"Ragone Chart," Wikipedia, http://en.wikipedia.org/wiki/Ragone_chart, pp. 1-2, downloaded Dec. 21, 2016.
Scherson et al., "Batteries and Electrochemical Capacitors," The Electricochemical Society Interface, pp. 17-22 (2006).
"15.13xEA—Ethylene Vinyl Acetate (EVA) Copolymers (>50% Ethylene)—European Adhesives," The ChemQuest Group, Inc. http://web.archive.org/web/20080219220919/http://www.chemquest.com/store/ethylene-vinyl-acetate-copolymers-european-adhesives.html (Aug. 26, 2011) (2 pages).
"Baymod L 2450," Product Data Sheet, LANXESS. (2 pages) (2007).
"DuPontTM Elvax® 3170," DuPont Packaging & Industrial Polymers. 3 pages (2004) http://web.archive.org/web/20060516114601/http://www2.dupont.com/Elvax/en_US/assets/downloa ds/vax3170.pdf.
"Elvaloy resins," Product Data Sheet, DuPont Packaging & Industrial Polymers. (2 pages) (2010).
"Filling and sealing of containers" in Fellows, P.J. Food Processing Technology—Principles and Practice (2nd Edition), Woodhead Publishing, pp. 511-527 (2000).
"Polybutylene terephthalate," Britannica Online Encyclopedia. pp. 1-3 (Accessed on Sep. 7, 2011) <http://www.britannica.com/EBchecked/topic/468341/polybutylene-terephthalate-PBT>.
"Polybutylene terephthalate (PBT)," 1 page <http://www.britannica.com/EBchecked/topic/468341/polybutylene-terephthalate-PBT> (Accessed on Jun. 13, 2012).
"Polymer Blend," IUPAC Compendium of Chemical Terminology. 2nd Edition, p. 1 (1997).
Advisory Action corresponding to U.S. Appl. No. 12/319,150 dated Nov. 13, 2013.
Advisory Action corresponding to U.S. Appl. No. 11/801,609 dated Jun. 16, 2016.
Annonymous, "Advantages of metallocene ethylene [olymer resins in multilayer stretch films," Research Disclosure, Mason Publications, Hampshire, GB. vol. 419, No. 26, pp. 1-22 (1999).
Annonymous, "Some benefits from the use of metallocene ethylene polymers in blown and cast films," Research Disclosure, Mason Publications, Hampshire, GB. vol. 392, No. 54, pp. 1-6 (1996).
ASTM D 1003-07 "Haze and Luminous Transmittance of Transparent Plastics," ASTM International. pp. 1-7 (Nov. 2007).
ASTM D 1525-07 "Vicat Softening Temperature of Plastics," ASTM International, pp. 1-9 (Mar. 2007).
ASTM D 2732-03 "Unrestrained Linear Thermal Shrinkage of Plastic Film and Sheeting," ASTM International, pp. 1-5 (Oct. 2003).

(56) References Cited

OTHER PUBLICATIONS

ASTM D3418-08. Standard Test Method for Transition Temperatures and Enthalpies of Fusion and Crystallization of Polymers by Differential Scanning Calorimetry. American National Standards Institute. pp. 1-7 (Dec. 2008).
ASTM D3985. Standard Test Method for Oxygen Gas Transmission Rate Through Plastic Film and Sheeting Using a Coulometric Sensor. American National Standards Institute, pp. 1-7 (Nov. 2012).
ASTM D882-09. Standard Test Method for Tensile Properties of Thin Plastic Sheeting. American National Standards Institute, pp. 1-9 (Jan. 2009).
ASTM F1927-07. Standard Test Method for Determination of Oxygen Gas Transmission Rate, Permeability and Permeance at Controlled Relative Humidity Through Barrier Materials Using a Coulometric Detector. American National Standards Institute, pp. 1-6 (Aug. 2007).
BS 2782-0:2004 "Methods of Testing Plastics," British Standards Institution, pp. 1-29 (2004).
English abstract of JP 2005-103902, USUI, Apr. 2005.
European Search Report corresponding to European Patent Application No. 08173057.4-2307 dated Sep. 22, 2009.
European Search Report corresponding to European Patent Application No. 08173056.6-2109 dated Mar. 16, 2009.
Extended European Search report corresponding to European Patent Application No. 09151289.7-2124 dated Jun. 8, 2009.
Extended European Search Report corresponding to European Patent Application No. 05021541.7- 2115 dated Dec. 2, 2005.
Extended European Search Report corresponding to European Patent Appication. No. 08156814 dated Oct. 9, 2008.
Extended European Search Report corresponding to European Patent Application No. 08154742.4-2124 dated Jul. 2, 2009.
Extended European Search Report corresponding to European Patent Application No. 10193414.9-1217 dated May 9, 2011.
Harper, "Modern Plastics Handbook," McGraw-Hill: New York, New York. pp. 3.17-3.22 (2000).
Hough, M., and Dolbey, R., "Modern Plastics Compendium, vol. 1—Key Properties and Sources," Smithers Rapra Technology. pp. 87-124 (1995).
Huskić, M., and Šebenik, A., "Characterization of Crosslinked Ethylene-Vinylacetate Copolymers," Polymer International. vol. 31, No. 1 pp. 41-44 (1993).
Interview Summary corresponding to U.S. Appl. No. 11/801,609 dated Jul. 31, 2012.
Interview Summary corresponding to U.S. Appl. No. 12/150,261 dated Dec. 28, 2010.
Interview Summary corresponding to U.S. Appl. No. 12/150,261 dated Sep. 21, 2011.
Interview Summary corresponding to U.S. Appl. No. 12/150,261 dated Jun. 12, 2012.
Interview Summary corresponding to U.S. Appl. No. 12/319,149 dated Oct. 17, 2011.
Interview Summary corresponding to U.S. Appl. No. 12/319,149 dated Jun. 15, 2012.
Interview Summary corresponding to U.S. Appl. No. 12/319,150 dated Sep. 23, 2011.
Interview Summary corresponding to U.S. Appl. No. 12/319,150 dated Sep. 6, 2013.
Interview Summary corresponding to U.S. Appl. No. 12/322,347 dated Sep. 21, 2011.
Interview Summary corresponding to U.S. Appl. No. 12/508,233 dated Apr. 26, 2012.
Interview Summary corresponding to U.S. Appl. No. 13/722,323 dated Jan. 22, 2016.
Interview Summary corresponding to U.S. Appl. No. 13/682,160 dated Oct. 28, 2016.
Kipp, "Plastic Material Data Sheets," MatWeb (2004) (5 pages).
Machine Translation of JP 2005-103902, USUI, Apr. 2005.
Notice of Allowance corresponding to U.S. Appl. No. 11/528,741 dated Oct. 28, 2011.
Notice of Allowance corresponding to U.S. Appl. No. 12/150,168 dated Nov. 25, 2013.
Notice of Allowance corresponding to U.S. Appl. No. 13/157,876 dated Nov. 12, 2015.
Notice of Allowance correspoding to U.S. Appl. No. 12/319,150 dated Feb. 12, 2016.
Notice of Allowance corresponding to U.S. Appl. No. 13/523,462 dated May 16, 2016.
Official action corresponding to European Patent Application No. 10 193 414.9-1303 dated Oct. 29, 2014.
Official Action corresponding to New Zealand Patent Application No. 626181 dated Jun. 18, 2014.
Official Action corresponding to United Kingdom Patent Application No. GB1020302.4 dated Jul. 2, 2014.
Official Action corresponding to United Kingdom Patent Application No. GB1020302.4 dated Dec. 11, 2014.
Official Action corresponding to U.S. Appl. No. 11/801,609 dated Sep. 15, 2009.
Official Action corresponding to U.S. Appl. No. 11/801,609 dated Feb. 5, 2010.
Official Action corresponding to U.S. Appl. No. 12/150,261 dated Oct. 27, 2009.
Official Action corresponding to U.S. Appl. No. 12/319,149 dated Oct. 15, 2009.
Official Action corresponding to U.S. Appl. No. 11/528,741 dated Mar. 30, 2010.
Official Action corresponding to U.S. Appl. No. 12/150,261 dated Jul. 7, 2010.
Official Action corresponding to U.S. Appl. No. 12/319,149 dated Jul. 7, 2010.
Official Action corresponding to U.S. Appl. No. 11/801,609 dated Jul. 15, 2010.
Official Action corresponding to U.S. Appl. No. 12/322,347 dated Sep. 14, 2010.
Official Action corresponding to U.S. Appl. No. 12/319,150 dated Oct. 15, 2010.
Official Action corresponding to U.S. Appl. No. 11/528,741 dated Jan. 4, 2011.
Official Action corresponding to U.S. Appl. No. 12/508,233 dated Mar. 9, 2011.
Official Action corresponding to U.S. Appl. No. 12/150,168 dated Feb. 16, 2011.
Official Action corresponding to U.S. Appl. No. 12/322,347 dated Mar. 16, 2011.
Official Action corresponding to U.S. Appl. No. 12/150,261 dated Mar. 22, 2011.
Official Action corresponding to U.S. Appl. No. 12/319,149 dated Mar. 22, 2011.
Official Action corresponding to U.S. Appl. No. 12/154,662 dated Mar. 29, 2011.
Official Action corresponding to U.S. Appl. No. 12/319,150 dated Apr. 26, 2011.
Official Action corresponding to U.S. Appl. No. 11/528,741 dated May 18, 2011.
Official Action corresponding to U.S. Appl. No. 11/801,609 dated Jun. 20, 2011.
Official Action corresponding to U.S. Appl. No. 12/154,662 dated Aug. 18, 2011.
Official Action corresponding to U.S. Appl. No. 12/154,662 dated Jan. 18, 2012.
Official Action corresponding to U.S. Appl. No. 12/512,361 dated Aug. 31, 2011.
Official Action corresponding to U.S. Appl. No. 12/150,168 dated Sep. 23, 2011.
Official Action corresponding to U.S. Appl. No. 12/322,347 dated Oct. 26, 2011.
Official Action corresponding to U.S. Appl. No. 12/319,150 dated Nov. 4, 2011.
Official Action corresponding to U.S. Appl. No. 12/508,233 dated Nov. 23, 2011.
Official Action corresponding to U.S. Appl. No. 12/508,233 dated Jun. 6, 2012.

(56) References Cited

OTHER PUBLICATIONS

Official Action corresponding to U.S. Appl. No. 12/319,149 dated Dec. 2, 2011.
Official Action corresponding to U.S. Appl. No. 12/957,947 dated Jan. 17, 2012.
Official Action corresponding to U.S. Appl. No. 11/801,609 dated Jan. 30, 2012.
Official Action corresponding to U.S. Appl. No. 12/150,261 dated Jan. 31, 2012.
Official Action corresponding to U.S. Appl. No. 12/426,496 dated Feb. 7, 2012.
Official Action corresponding to U.S. Appl. No. 12/512,361 dated May 2, 2012.
Official Action corresponding to U.S. Appl. No. 12/322,347 dated May 15, 2012.
Official Action corresponding to U.S. Appl. No. 12/150,168 dated Aug. 14, 2012.
Official Action corresponding to U.S. Appl. No. 12/319,149 dated Aug. 27, 2012.
Official Action corresponding to U.S. Appl. No. 12/957,947 dated Sep. 25, 2012.
Official Action corresponding to U.S. Appl. No. 12/319,150 dated Mar. 14, 2013.
Official Action corresponding to U.S. Appl. No. 12/150,168 dated Apr. 26, 2013.
Official Action corresponding to U.S. Appl. No. 12/957,947 dated Jul. 24, 2013.
Official Action corresponding to U.S. Appl. No. 13/157,876 dated Nov. 19, 2013.
Official Action corresponding to U.S. Appl. No. 11/801,609 dated Nov. 29, 2013.
Official Action corresponding to U.S. Appl. No. 13/722,323 dated Mar. 27, 2014.
Official Action corresponding to U.S. Appl. No. 12/957,947 dated Apr. 24, 2014.
Official Action corresponding to U.S. Appl. No. 13/157,876 dated Jun. 2, 2014.
Official Action corresponding to U.S. Appl. No. 12/322,347 dated Aug. 1, 2014.
Official Action corresponding to U.S. Appl. No. 11/801,609 dated Sep. 24, 2014.
Official Action corresponding to U.S. Appl. No. 13/722,323 dated Jan. 7, 2015.
Official Action corresponding to U.S. Appl. No. 12/957,947 dated Jan. 7, 2015.
Official Action corresponding to U.S. Appl. No. 13/523,462 dated Jan. 30, 2015.
Official Action corresponding to U.S. Appl. No. 13/157,876 dated Mar. 3, 2015.
Official Action corresponding to U.S. Appl. No. 12/322,347 dated May 20, 2015.
Official Action corresponding to U.S. Appl. No. 11/801,609 dated Jun. 12, 2015.
Official Action corresponding to U.S. Appl. No. 13/682,160 dated Jun. 15, 2015.
Official Action corresponding to U.S. Appl. No. 13/722,323 dated Jul. 17, 2015.
Official Action corresponding to U.S. Appl. No. 12/319,150 dated Jul. 22, 2015.
Official Action corresponding to U.S. Appl. No. 12/957,947 dated Sep. 16, 2015.
Official Action corresponding to U.S. Appl. No. 13/523,462 dated Sep. 21, 2015.
Official Action corresponding to U.S. Appl. No. 14/612,175 dated Dec. 9, 2015.
Official Action corresponding to U.S. Appl. No. 13/682,160 dated Jan. 29, 2016.
Official Action corresponding to U.S. Appl. No. 11/801,609 dated Feb. 2, 2016.
Official Action corresponding to U.S. Appl. No. 12/322,347 dated Feb. 18, 2016.
Official Action corresponding to U.S. Appl. No. 12/957,947 dated Mar. 31, 2016.
Official Action corresponding to U.S. Appl. No. 13/722,323 dated May 3, 2016.
Official Action corresponding to U.S. Appl. No. 13/682,160 dated Jun. 30, 2016.
Official Action corresponding to U.S. Appl. No. 14/304,101 dated Jun. 30, 2016.
Official Action corresponding to U.S. Appl. No. 14/612,175 dated Aug. 5, 2016.
Official Action corresponding to U.S. Appl. No. 12/322,347 dated Aug. 17, 2016.
Official Action corresponding to U.S. Appl. No. 12/957,947 dated Sep. 26, 2016.
Petrie, "Handbook of Adhesives and Sealants," 2nd Edition. McGraw-Hill: New York, New York. pp. 465-466 (2007).
"Polymer Materials Selection for Radiation-Sterilized Products," pp. 1-3 <http://www.mddionline.com/article/polymer-materials-selection-radiation-sterilized-products> dated Feb. 1, 2000.
Search Report corresponding to French Patent Application No. 1059997 dated Jan. 16, 2012.
Unisource—Moisture Barrier & Oxygen Barrier Transmission Rates; 1 page, <http://www.unisourcelink.com/packaging/pdf/MoistureBarrier.pdf> (Retrieved on Jan. 10, 2012).
Notice of Allowance corresponding to U.S. Appl. No. 14/304,101 dated Jul. 10, 2017.
Office Action corresponding to U.S. Appl. No. 11/801,609 dated Jun. 14, 2017.
Office Action corresponding to European Patent Application No. 10193414.9 dated May 16, 2017.
Office Action corresponding to U.S. Appl. No. 12/957,947 dated Sep. 19, 2017.
Extended European Search Report corresponding to European Patent Application No. 18213603.6-1107 dated Apr. 3, 2019.
Extended European Search Report corresponding to European Patent Application No. 18213611.9-1107 dated Apr. 3, 2019.
Advisory Action and AFCP 2.0 Decision corresponding to U.S. Appl. No. 14/612,175 dated Jun. 1, 2020.
Office Action corresponding to European Patent Application No. 10193414.9 dated Apr. 11, 2019.
Office Action corresponding to U.S. Appl. No. 12/322,347 dated Aug. 19, 2019.
Office Action corresponding to U.S. Appl. No. 14/612,175 dated Aug. 20, 2019.
Office Action corresponding to U.S. Appl. No. 14/612,175 dated Mar. 3, 2020.
Office Action corresponding to U.S. Appl. No. 12/322,347 dated Mar. 3, 2020.
Office Action corresponding to U.S. Appl. No. 14/612,175 dated Jun. 10, 2020.
Office Action corresponding to U.S. Appl. No. 12/322,347 dated Jul. 2, 2020.
Search Report corresponding to Turkish Patent Application No. 2018/19787 dated Mar. 27, 2020.
Machine Translation of JP H06-322140, 7 pages (Year: 1994).
Office Action corresponding to U.S. Appl. No. 12/322,347 dated Jun. 15, 2021.
Office Action corresponding to U.S. Appl. No. 16/227,191 dated Sep. 24, 2021.
Office Action corresponding to New Zealand Patent Application No. 749501 dated Oct. 27, 2021.
Office Action corresponding to Turkish Patent Application No. 2018/19787 dated Nov. 5, 2021.
Decision on Appeal corresponding to U.S. Appl. No. 12/957,947 dated Sep. 18, 2020.
Office Action corresponding to U.S. Appl. No. 16/227,191 dated Aug. 31, 2020.
Office Action (Restriction Requirement) corresponding to U.S. Appl. No. 16/227,178 dated Nov. 3, 2020.
Advisory Action corresponding to U.S. Appl. No. 12/322,347 dated Nov. 23, 2020.

(56) References Cited

OTHER PUBLICATIONS

Office Action corresponding to European Patent Application No. 10193414.9 dated Apr. 7, 2020.
Office Action corresponding to U.S. Appl. No. 14/612,175 dated Nov. 23, 2020.
Office Action (Restriction Requirement) corresponding to U.S. Appl. No. 16/266,567 dated Dec. 30, 2020.
Office Action corresponding to U.S. Appl. No. 12/322,347 dated Jan. 19, 2021.
Office Action corresponding to U.S. Appl. No. 16/227,191 dated Mar. 9, 2021.
Office Action corresponding to U.S. Appl. No. 16/227,178 dated Mar. 15, 2021.
Office Action corresponding to New Zealand Patent Application No. 749501 dated Mar. 11, 2021.
Office Action corresponding to U.S. Appl. No. 16/266,567 dated Apr. 1, 2021.
Office Action corresponding to U.S. Appl. No. 14/612,175 dated May 5, 2021.
Office Action corresponding to U.S. Appl. No. 12/322,347 dated Nov. 19, 2021.
Office Action corresponding to Czech Patent Application No. PV 2018-736 dated May 30, 2022 [Machine Translation].
Office Action corresponding to U.S. Appl. No. 16/227,178 dated Dec. 10, 2021.
Office Action (Restriction Requirement) corresponding to U.S. Appl. No. 16/266,567 dated Jan. 6, 2022.
Office Action corresponding to U.S. Appl. No. 14/612,175 dated Feb. 18, 2022.
Office Action corresponding to U.S. Appl. No. 16/227,191 dated Apr. 21, 2022.
Office Action corresponding to U.S. Appl. No. 16/266,567 dated Jul. 22, 2022.
Office Action corresponding to U.S. Appl. No. 16/227,178 dated Aug. 16, 2022.
Pelestat 300, "Polymer-Alloy Type Permanent Antistatic Agent for Polyolefin," Harwick Standard Distribution Corporation, harwick.com/files/tds/PELESTAT_300.PDF. 8 pages, dated Apr. 1, 2010.
IonPhasE IPE U1, Technical Data Sheet, IonPhasE Oy, www.uni-trading.com/sub/support/tds.msds/additive/IPE/TDS/IPE-U1%20TDS(EN).pdf, 1 page (2016).
Communication pursuant to Article 94(3) EPC corresponding to European Patent Application Serial No. 12 192 895.6 dated May 12, 2014.
Communication pursuant to Article 94(3) EPC corresponding to European Patent Application Serial No. 12 192 895.6 dated Feb. 18, 2015.
Communication pursuant to Article 94(3) EPC corresponding to European Patent Application Serial No. 12 192 895.6 dated Dec. 9, 2015.
Communication pursuant to Article 94(3) EPC corresponding to European Patent Application Serial No. 12 192 895.6 dated Oct. 7, 2016.
Communication pursuant to Article 94(3) EPC corresponding to European Patent Application Serial No. 12 192 895.6 dated Apr. 13, 2017.
Communication under Rule 71(3) EPC Intention to Grant corresponding to European Patent Application Serial No. 12 192 895.6 dated Apr. 20, 2018.
Extended European Search Report corresponding to European Patent Application No. 12192895.6-1708 dated Mar. 1, 2013.
Notice of Allowance corresponding to U.S. Appl. No. 15/042,615 dated Nov. 21, 2018.
Office Action corresponding to U.S. Appl. No. 12/322,347 dated Mar. 30, 2018.
Office Action corresponding to U.S. Appl. No. 12/957,947 dated May 7, 2018.
Office Action corresponding to U.S. Appl. No. 13/682,160 dated Jul. 25, 2018.
Office Action corresponding to U.S. Appl. No. 12/322,347 dated Oct. 25, 2018.
Office Action corresponding to U.S. Appl. No. 14/612,175 dated Nov. 2, 2018.
Office Action (Examiner's Answer) corresponding to U.S. Appl. No. 12/957,947 dated Jan. 4, 2019.
Response to the Summons to Attend Oral Proceedings dated Nov. 15, 2017 corresponding to European Patent Application No. 12192895.6 dated Mar. 27, 2018.
Summons to attend oral proceedings pursuant to Rule 115(1) EPC corresponding to European Patent Application Serial No. 12192895.6 dated Nov. 15, 2017.
Interview Summary corresponding to U.S. Appl. No. 16/227,191 dated Mar. 10, 2023.
Office Action corresponding to U.S. Appl. No. 16/227,191 dated May 5, 2023.
Notice of Allowance corresponding to U.S. Appl. No. 16/227,178 dated May 17, 2023.

\* cited by examiner

OVEN SKIN PACKAGING PROCESS

CROSS-REFERENCE TO RELATED APPLICATIONS

The present U.S. patent application claims priority to European Patent Application No. 14193920.7, filed Nov. 19, 2014, the disclosure of which is incorporated herein by reference in its entirety.

TECHNICAL FIELD

The invention relates to a vacuum skin food package for use in a conventional oven and more particularly to a food package able to withstand conditions up to 200° C. comprising a thermoplastic lid film which is free of polyester and contains crosslinked EVA.

BACKGROUND

Plastic containers have been increasingly used in packaging applications, such as "food packaging", and in particular for cook-in convenience foods. For example, ready-prepared ovenable meals which can be warmed in a conventional oven. Today, busy customers are demanding higher quality products, easier-to-use packaging and faster reheating options to achieve more flexibility in the kitchen. The ability to cook food in the conventional oven is a practical necessity.

Vacuum skin packaging is a known packaging process in which after food is placed in a container (often a tray), air is drawn from the package prior to sealing it close. Such packaging has comparable storage and preservation characteristics to shrinkable packaging and usually is more eye appealing.

The vacuum skin packaging in general involves two packaging containers:
1. The top lid film which conform onto the product
2. The bottom thermoformable film which is formed into a tray during the first step of the packing process and where-into the food is placed prior to the vacuum step. Often, a ready-made tray is used instead of a bottom thermoformable film.

Cook-in packaging is packaging in which a food product is packed non-cooked or pre-cooked to the consumer. The consumer then warms or cooks the food without removing the package.

The cook-in concept is particularly desired since it avoids the need for the consumer to handle raw meat or fish, which is often disagreeable. Moreover, the handling of raw meat is a growing concern from a food safety perspective while a pre-packed cook in food package reduces the risk of contamination.

In case the cook-in is done in a conventional oven, the films or trays used must combine the following features
1. Enough thermal resistance not to disintegrate in the oven during a cooking process at 200° C. lasting 1 hour.
2. The sealing of the top lid film to the tray or bottom thermoformable film must be strong enough to avoid any leakers or unsealed areas which could be dangerous for the food integrity.
3. The oxygen barrier of both top and bottom (or tray) materials are high enough to protect the film from oxygen ingress which is detrimental for the shelf life of the product.

Experience has shown that for the bottom thermoformable film/tray the options are
1. Polyester sheet or ready-made tray
2. Plain aluminium tray
3. Coated aluminium tray.

Polypropylene based sheet or tray could be also used but only in relatively mild oven conditions.

In the art a lot of different ovenable films have been proposed and used for cook-in processes.

For example EP08162162.5 describes an ovenable film that is used for making bags. The film comprises polyamide, crosslinked EVA and polyester and is able to withstand the oven cook-in process.

Application US2010/0221391 describes an ovenable vacuum skin packaging process wherein the top film used is comprised of polyester. It is our experience that this material combination is not able to create vacuum skin packages with big cavities as is often the case in the art. Also polyester is more difficult to coextrude with high barrier materials like EVOH and PVDC thus limiting the oxygen barrier properties of the film.

Application EP243510 describes a film for vacuum skin packaging comprising ethylene vinyl acetate copolymer. Potential use in ovenable process is not discussed.

SUMMARY

The present invention describes an ovenable vacuum skin pack wherein the top lidding film comprises at least 30% by volume of crosslinked ethylene vinyl acetate copolymer, is free of polyester and wherein the bottom container comprises polyester or aluminum.

The present invention describes a cook-in process comprising the following steps:
a) Putting food in a container comprising polyester or aluminum
b) Making a vacuum skin pack while a top lid film which comprises at least 30% per volume of crosslinked ethylene vinyl acetate copolymer conforms to the product and seals to the container of step 1 thus creating an intact package
c) Putting the pack in a conventional oven
d) Cooking the pack for up to 200° C. for up to 2 hours

DEFINITIONS

In this application the following definitions are used:

The term "vacuum skin packaging" is interpreted as well known in the art. That is, a process wherein a top lid film is drawn so that it conforms to the product to be packed and seals at a bottom film or tray.

The term "film" refers to a flat or tubular flexible structure of thermoplastic material.

As used herein the term "top lidding film" refers to the film which conforms to the product during the vacuum skin packaging process. It is also called "top film".

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere).

The phrase "inner layer" refers to the film layer that comes in direct contact with the product packed. This is also called "sealing layer" as this layer must be hermetically sealed in order to protect the product from ingress of air.

The phrase "intermediate layer" refers to any layer of the film that is neither outer nor inner layer. A film may comprise more than one intermediate layers.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above defined types, homopolymer and copolymer.

As used herein the term "polyethylene" identifies polymers consisting essentially of the ethylene repeating unit. The ones that have a density more than 0.940 are called high density polyethylene (HDPE), the ones that are have less than 0.940 are called low density polyethylene (LDPE).

As used herein the phrase "ethylene alpha olefin copolymer" refers to polymers like linear low density polyethylene (LLDPE), medium density polyethylene (MDPE), very low density polyethylene (VLDPE), ultra-low density polyethylene (ULDPE), metallocene catalysed polymers and polyethylene plastomers and elastomers.

In these cases the alpha olefin can be propene, butene, hexene, octene etc as known in the art.

As used herein the term "homogeneous ethylene alpha olefin copolymers" refer to ethylene alpha olefin copolymers having a molecular weight distribution rate Mw/Mn less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40% per weight. Abbreviation used is EMA.

As used herein the phrase "ethylene vinyl acetate copolymer" refers to copolymers of ethylene and vinyl acetate. Abbreviation used is EVA.

As used the term "crosslinked EVA" refers to copolymers of ethylene and vinyl acetate which have created crosslink structure. This is achieved often by radiation or by using peroxides. The crosslinking is usually done during extrusion of the film or at a later stage.

As used herein, the term EVOH refers to saponified products of ethylene vinyl ester copolymers. The ethylene content is typically in the range of 25 to 50% per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term polyamide refers to homopolymers and copolymers.

As used herein the term "ionomer" refers to ethylene-acid copolymers which have been neutralized by metals such as sodium, zinc, lithium or others.

The acid used is usually methacrylic or acrylic acid.

As used herein, the term "ethylene acid copolymer" refers to copolymers of ethylene with acid, most usually methacrylic or acrylic acid.

As used herein, the term "polyester" includes crystalline polymers, amorphous polymers and polyester elastomers.

Common polyesters are crystalline PET (polyethylene terephthalate), amorphous PET, PETG (glycol modified polyethylene terephthalate), PBT (polybutylene terephthalate), PTT (polytrimethylene terephthalate), PBN (polybutylene naphthalate), PEN (polyethylene naphthalate), polyester-ether block copolymers and polyester-ester block copolymers of hard and soft blocks.

Other polyester materials are also included in the above definition.

As used herein the term "polybutylene" refers to butene-1 homopolymers and copolymers. Useful copolymers comprise ethylene mer units. The ethylene content should be generally less than 50% per weight.

As used herein, the aluminum trays may be plain (without any coating) or coated.

Unless otherwise indicated the percentages given within the application are % by weight.

DETAILED DESCRIPTION

The present invention describes an ovenable vacuum skin pack wherein the top lidding film comprises at least 30% by volume of crosslinked ethylene vinyl acetate copolymer, is free of polyester and wherein the bottom container comprises polyester or aluminum.

Preferably the top lidding film comprises at least 50% by volume of crosslinked ethylene vinyl acetate copolymer, more preferably at least 70% by volume of crosslinked ethylene vinyl acetate copolymer.

In one of the preferred versions, the top lidding film further comprises an ionomer. The neutralization ratio of the ionomer is preferably more than 55%, preferably more than 70%. Preferably the top lidding film comprises less than 80% ionomer per volume, more preferably less than 50%, even more preferably less than 20%, most preferably less than 10%. In another preferred version the film is ionomer free.

In a further preferable version the top lidding film comprises at least two layers, and the inner layer comprises EVA, EMA, ethylene acid copolymer or ionomer.

In a further preferable version the top lidding film comprises an intermediate layer.

According to the invention, the top lidding film comprises at least 30% by volume crosslinked EVA. The crosslinked EVA may preferably be a component of the intermediate layers or the inner layer.

The present invention describes a cook-in process comprising the following steps:
a) Putting the food in a container comprising polyester or aluminum
b) Making a vacuum skin pack while a top lid film which comprises at least 30% per volume of crosslinked ethylene vinyl acetate copolymer conforms to the product and seals to the container of step 1 thus creating an intact package
c) Putting the pack in a conventional oven
d) Cooking the pack for up to 200° C. for up to 2 hours Preferably the top lid film of the present invention as described above is used in the cook-in process of the present invention, including all the above disclosed options for the top lidding film.

Top Lidding Film Construction

Preferably the film comprises 5 to 15 layers, more preferably 7 to 12 layers. A typical example of the film construction comprises 7 layers in the following arrangement:

Outer layer/intermediate layer/tie layer/barrier layer/tie layer/intermediate layer/inner layer The film is preferably produced by the hot blown film method. Preferably the film is not heat shrinkable.

Barrier Layer(s)

Preferably the film comprises high oxygen barrier materials so that it protects the components of the pack from the detrimental effect of oxygen ingress. Preferably the high oxygen barrier material is selected from EVOH, polyamide, and PVDC. More preferably the high oxygen barrier material is EVOH. The EVOH comprises preferably 24 to 50% ethylene per mol, more preferably 27 to 48% ethylene per mol.

Intermediate Layer(s)

Preferably, the intermediate layers comprise EVA. The EVA can be alone in this layer or in a form of blend or compound. Suitable blending partners for the EVA include EMA, ethylene alpha olefin copolymers, styrene polymers, LDPE and others.

The vinyl acetate content of the EVA used in the intermediate layers is preferably 3 to 90% per weight, more preferably 5 to 80%. Preferred melt flow indexes are 0.3 to 5 measured at 190° C., 2.16 kilos. As per ASTM D1238.

In one preferred version, the intermediate layers of the film are free from ionomer.

Tie Layer(s)

As well known in the art, there is no natural adhesion between polyolefins such as EVA and high barrier polymers such as EVOH. Therefore, suitable adhesive resins must be used so that the film does not collapse under the oven heating.

Suitable materials for the tie layer process include maleic anhydride modified EVA, maleic anhydride modified polyethylene, maleic anhydride modified EMA, maleic anhydride modified elastomer, partially saponified EVA copolymer and polyurethane elastomer.

Outer Layer

The outer layer of the film preferably comprises LLDPE, LDPE or HDPE produced by Ziegler Natta or metallocene catalyst.

Inner Layer

The inner layer of the film would be able to seal the film to the container (bottom film or tray).

Preferable options for this layer include EVA copolymer, EMA copolymer, ethylene acid copolymer and ionomer.

In general, the above layers may comprise further well known in the art additives such as antiblock, slip, antifog, polymer processing enhancers and others. Additives that would enhance the crosslinking are also inside the scope of the invention as long as they are approved for food contact.

Crosslinking

The crosslinking may be done by various methods but the preferred are e-beam, gamma radiation and peroxides.

Container

The container can be a film or sheet thermoformed in line with the vacuum skin packaging process or a ready-made tray.

In one preferable version of the invention, the container is a tray or sheet with a thickness of at least 300 microns.

In a further preferable version, the tray or sheet comprises polyester, preferably CPET.

There are different options for manufacturing the CPET comprising sheet or tray. One possibility is a 3 layer construction A/B/C wherein the A and C layers consist of virgin polymer while B comprises recycled polymer.

In another preferable version the container is a tray comprising aluminum. Aluminum can be supplied in two options, as plain aluminum with no coating, or as aluminum with a coating, preferably the coating is polyester.

In general, making a vacuum skin pack with uncoated aluminum tray is a challenge for the art. However, this option has certain advantages over the use of polyester, e.g. easier to manufacture and more convenient. The inventors of the present invention could show that an uncoated aluminum tray can be easily used applying the top lidding film according to the present invention.

EXAMPLE 1

From a commercial hot blown film line we produced the following film
Outer layer, thickness 10 microns
Intermediate layer 1, thickness 35 microns
Tie layer 1, thickness 8 microns
EVOH, thickness 8 microns
Tie layer 2, thickness 8 microns
Intermediate layer 2, thickness 15 microns
Inner layer, thickness 16 microns.
Wherein the
  Outer layer is 100% per weight LLDPE with density 0.918 and MFI 1 at 190° C., 2.16 kilos
  Intermediate layer 1 and 2 are EVA 12% per weight VA
  Tie layer 1 and 2 are anhydride modified LLDPE with MFI 2.5 at 190° C., 2.16 kilos.
  Inner layer comprises an EVA based compound.
  None of the layers comprise polyester.
  The film was irradiated at a level to achieve a gel content of 65%. Gel content is measured according to ASTM D2765.
  Then the film was put on a vacuum skin packaging machine as top lidding film.
  As container, CPET trays were used.
  The product packed was 500 gr beef portions.
  The vacuum skin packs produced were judged as appealing in appearance. There were no breaks of the top lidding film as is often the problem in vacuum skin packaging production.

Cook-In Test

The vacuum skin pack was tested in a house oven setting the temperature to 200° C. in normal convection mode (no forced air).

After 1 hour cooking the packs were opened and tested as per film degradation, cooking quality and food palatability.

There was no visible thermal degradation of the top lidding film.

The cooking quality was very good.

Palatability was very good.

EXAMPLE 2

From a commercial hot blown film line we produced the following film
Outer layer, thickness 10 microns
Intermediate layer 1, thickness 35 microns
Tie layer 1, thickness 8 microns
EVOH, thickness 8 microns
Tie layer 2, thickness 8 microns
Intermediate layer 2, thickness 15 microns
Inner layer, thickness 16 microns.
Wherein the
  Outer layer is 100% LLDPE with density 0.918 and MFI 1 at 190° C., 2.16 kilos
  Intermediate layer 1 and 2 are EVA 12% VA per weight
  Tie layer 1 and 2 are anhydride modified LLDPE with MFI 2.5 at 190 C and 2.16 kilos.
  Inner layer comprises an ethylene acrylic acid copolymer
  None of the layers comprise polyester.
The film was irradiated at a level to achieve a gel content of 70%.
Then the film was put on a vacuum skin packaging machine as top lidding film.
As container, plain and coated aluminum trays were used.
The product packed was 500 gr beef portions.
The vacuum skin packs produced were judges as appealing in appearance. There were no breaks of the top lidding film as is often the problem in vacuum skin packaging options.
The sealing was very good in the case of coated aluminum trays and acceptable (easy open but still no leaker areas) in the case of plain aluminum.

Cook-In Test

The vacuum skin pack was tested in a house oven putting the set temperature at 200° C. in normal convection mode (no forced air).
After 1 hour cooking the packs were opened and tested as per film degradation, cooking quality and food palatability.
There was no visible thermal degradation of the top lidding film.
The cooking quality was very good.
Palatability was very good.

COMPARATIVE EXAMPLES

Two comparative combinations were used.

Comparative Example 1

Comparative Example 1 is based on example 1 and a polyester material was used instead of EVA in the intermediate layers. The film was tested both crosslinked and un-crosslinked.
Both films have severe problems running at the vacuum skin packaging machine.
The un-crosslinked film did not have enough memory and broke during the operation.
The crosslinked film was better but did not have enough memory to follow the meat irregularities and cavities. Therefor it was also judged not suitable for the operation.

Comparative Example 2

Comparative Example 2 is based on example 2 wherein the EVA used in the intermediate layers of example 2 was replaced by a zinc ionomer. The film was crosslinked with same dose as in example 2.

The film could withstand with success the vacuum skin packaging process, even following the packed products irregularities and cavities.

Cook In Test

At this stage under the already tested conditions of the examples above the film was torn.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An ovenable vacuum skin pack comprising a top lidding film and a bottom container, wherein the top lidding film comprises at least 30% by volume of crosslinked ethylene vinyl acetate copolymer (EVA) and is free of polyester, further wherein the top lidding film comprises at least four layers, wherein the at least four layers comprise a sealing layer configured to seal to the bottom container, a barrier layer, a tie layer adjacent to the barrier layer, and an intermediate layer adjacent to the tie layer; wherein said sealing layer comprises EVA, ethylene methacrylate copolymer (EMA), ethylene acid copolymer or ionomer; wherein the tie layer comprises maleic anhydride modified polyethylene, maleic anhydride modified EMA, maleic anhydride modified elastomer or polyurethane elastomer; wherein said intermediate layer comprises EVA: wherein the bottom container comprises polyester or aluminum; and wherein the pack is free of visible thermal degradation after one hour at 200 degrees Celsius (°C) in a conventional oven.

2. The pack of claim 1, wherein the top lidding film comprises at least 50% by volume of crosslinked ethylene vinyl acetate copolymer.

3. The pack of claim 1, wherein the top lidding film comprises at least 70% by volume of crosslinked ethylene vinyl acetate copolymer.

4. The pack of claim 1, wherein the top lidding film contains less than 10% per volume of ionomer.

5. The pack of claim 2, wherein the top lidding film contains less than 10% per volume of ionomer.

6. The pack of claim 3, wherein the top lidding film contains less than 10% per volume of ionomer.

7. A cook-in process comprising the following steps:
(a) putting the food in a container comprising polyester or aluminum;
(b) making a vacuum skin pack comprising a top lidding film, which comprises at least 30% per volume of crosslinked ethylene vinyl acetate copolymer (EVA), is free of polyester, conforms to the product, and seals to the container of step (a) thus creating an intact package, further wherein the top lidding film comprises at least four layers, wherein the at least four layers comprise a sealing layer configured to seal to the container, a barrier layer, a tie layer adjacent to the barrier layer, and an intermediate layer adjacent to the tie layer, wherein the sealing layer comprises EVA, ethylene methacrylate copolymer (EMA), ethylene acid copolymer or ionomer and wherein the tie layer comprises maleic anhydride modified polyethylene, maleic anhydride modified EMA, maleic anhydride modified elastomer or polyurethane elastomer; and wherein said intermediate layer comprises EVA;
(c) putting the pack in a conventional oven; and
(d) cooking the pack for up to 200° C. for up to 2 hours.

* * * * *